United States Patent
Klopfer et al.

(10) Patent No.: US 7,139,622 B2
(45) Date of Patent: Nov. 21, 2006

(54) METHOD AND DEVICE FOR PROGRAMMING A FAILSAFE CONTROL SYSTEM

(75) Inventors: Johannes Klopfer, Köngen (DE); Morteza Rasaei, Neuhausen (DE); Richard Veil, Stuttgart (DE)

(73) Assignee: Pilz GmbH & Co., Ostfildern (DE)

( * ) Notice: Subject to any disclaimer, the term of this patent is extended or adjusted under 35 U.S.C. 154(b) by 0 days.

(21) Appl. No.: 10/638,672

(22) Filed: Aug. 11, 2003

(65) Prior Publication Data

US 2004/0064205 A1 Apr. 1, 2004

Related U.S. Application Data

(63) Continuation of application No. PCT/EP02/01205, filed on Feb. 6, 2002.

(30) Foreign Application Priority Data

Feb. 20, 2001 (DE) ................. 101 08 962

(51) Int. Cl.
*G05B 9/02* (2006.01)
*G05B 11/01* (2006.01)

(52) U.S. Cl. .......................... 700/79; 700/21

(58) Field of Classification Search ................ 700/17, 700/83; 701/114; 710/110
See application file for complete search history.

(56) References Cited

U.S. PATENT DOCUMENTS

| | | | |
|---|---|---|---|
| 5,034,899 A | | 7/1991 | Schult |
| 5,168,441 A | * | 12/1992 | Onarheim et al. ............ 700/17 |
| 5,291,587 A | | 3/1994 | Kodosky et al. |
| 5,392,207 A | | 2/1995 | Wilson et al. |
| 5,452,201 A | * | 9/1995 | Pieronek et al. ............. 700/83 |
| 6,047,278 A | | 4/2000 | Winkelmann |
| 6,334,084 B1 | * | 12/2001 | Moteki et al. ............... 701/114 |
| 6,532,508 B1 | * | 3/2003 | Heckel et al. ............... 710/110 |

(Continued)

FOREIGN PATENT DOCUMENTS

DE 91 10 348.7 1/1992

(Continued)

OTHER PUBLICATIONS

Logo!; und warum Sie das übliche Verdrahten vergessen können; Apr. 1997; 6 sheets.

(Continued)

*Primary Examiner*—Anthony Knight
*Assistant Examiner*—Sunray Chang
(74) *Attorney, Agent, or Firm*—Harness, Dickey & Pierce, P.L.C.

(57) ABSTRACT

A method for programming a failsafe control system comprises the steps of defining logical interconnections between input signals of the failsafe control system and of assigning interconnection products to output signals of the failsafe control system. The steps of defining and assigning take place on the basis of predefined function-specific program modules, which are selected from a set of such program modules. According to one aspect, each selected program module is uniquely assigned to a defined functional group, with a first functional group containing program modules which pick up input signals of the failsafe control system and provide first interim variables in response thereto, a second functional group containing program modules which logically interconnect the first interim variables to one another and provide second interim variables in response thereto, and a third functional group containing program modules which assign the second interim variables to the output signals of the failsafe control system. A corresponding programming device is also disclosed.

13 Claims, 2 Drawing Sheets

U.S. PATENT DOCUMENTS

| | | |
|---|---|---|
| 6,633,278 B1 | 10/2003 | Hoegener et al. |
| 6,853,292 B1 | 2/2005 | Kramer et al. |
| 2002/0054125 A1 | 5/2002 | Salomon et al. |

FOREIGN PATENT DOCUMENTS

| | | |
|---|---|---|
| DE | 41 34 811 A1 | 4/1993 |
| DE | 43 12 305 A1 | 10/1994 |
| DE | 36 50 457 T2 | 5/1996 |
| DE | 690 24 726 T2 | 5/1996 |
| DE | 195 13 801 A1 | 10/1996 |
| DE | 693 11 099 T2 | 2/1998 |
| DE | 693 15 210 T2 | 3/1998 |
| DE | 198 41 194 A1 | 2/2000 |
| DE | 199 04 892 A1 | 8/2000 |
| DE | 199 04 893 A1 | 8/2000 |
| DE | 199 06 695 A1 | 8/2000 |
| EP | 0 284 605 B1 | 10/1988 |
| EP | 0 331 551 B1 | 9/1989 |
| EP | 0 418 393 A1 | 3/1991 |
| EP | 0 428 505 A3 | 5/1991 |
| EP | 0 428 505 B2 | 5/1991 |
| EP | 0 630 493 B1 | 12/1994 |
| EP | 0 645 026 B1 | 3/1995 |
| EP | 0 284 605 | 10/1998 |
| WO | WO 97/27540 | 7/1997 |
| WO | WO 98/36335 | 8/1998 |
| WO | WO 98/44399 | 10/1998 |
| WO | WO 99/28794 | 6/1999 |

OTHER PUBLICATIONS

Laser Scanner Interface LDI 101; Jun. 1998; 73 pages.
International Standard IEC 61131-1, Second edition, May 2003; 24 pages.
Safety-related parts of control systems; DIN EN954-1; Mar. 1997; 34 pages.
Handbook for LEGO® Mindstorms controller; © 1999 The LEGO Group; 28 pages.
Handbook for logiDOC/32 controller; © 1999 kirchner SOFT gmbH; 16 pages.
Handbook for ELOP II controller: © "logiCAD/32-Lizenz" kirchner SOFT Austria 1998; 160 pages.

\* cited by examiner

METHOD AND DEVICE FOR PROGRAMMING A FAILSAFE CONTROL SYSTEM

CROSS-REFERENCES TO RELATED APPLICATIONS

This application is a continuation of copending international patent application PCT/EP02/01205 filed on Feb. 6, 2002 designating the U.S., which PCT application is published in German language and claims priority from German patent application DE 101 08 962.7, filed on Feb. 20, 2001.

BACKGROUND OF THE INVENTION

The present invention relates to a method of programming a failsafe control system, and in particular to a method of programming a failsafe control system comprising the steps of:
defining logical interconnections between input signals of the failsafe control system and
assigning interconnection products to output signals of the failsafe control system,
with the definition of the interconnections and the assignment taking place on the basis of predefined function-specific program modules, which are selected from a set of such program modules.

The invention furthermore relates to a device for programming a failsafe control system, and in particular a device having a first part for selecting and parameterizing predefined function-specific program modules, by means of which logical interconnections can be defined between input signals of the failsafe control system and interconnection products can be assigned to output signals of the failsafe control system.

For the purposes of the present invention, a failsafe control system is a unit or a device which picks up the input signals supplied by sensors and generates output signals there from by logical interconnections and, under some circumstances, some further signal- or data-processing steps. The output signals can then be fed to actuators, which specifically effect actions or reactions in the surroundings in response to the input signals. A preferred field of application for such failsafe control systems is in the area of machine safety, and in particular the monitoring of emergency-off buttons, two-hand controls, protective doors or light curtains. Such sensors are used for example to make safe a machine which, when operated, gives rise to a risk to people or property. When the protective door is opened or when the emergency-off button is actuated, a respective signal is generated and fed to the failsafe control system as an input signal. In response to this, the failsafe control system then shuts down the dangerous part of the machine by means of an actuator for example.

In contrast to a "normal" control system, it is characteristic of a failsafe control system that, even when a malfunction occurs in it or in a device connected to it, the failsafe control system must always ensure a safe state of the dangerous installation or machine. Therefore, failsafe control systems have to meet extremely high requirements in terms of intrinsic failsafety, which has the consequence of considerable expenditure on development and production. Failsafe control systems generally require special authorization from responsible supervisory authorities before they are used, such as for example in Germany from the employers' liability insurance associations or what is known the TÜV (technical inspection and testing organization). The failsafe control system must in this case conform to predetermined safety standards, which are laid down for example in European Standard EN 954-1. Therefore, a failsafe control system is understood hereafter as meaning a device which conforms at least to safety category 3 of said European standard or an equivalent standard.

A programmable failsafe control system offers the user the possibility of individually defining logical interconnections, and if appropriate further signal- or data-processing steps, according to his needs with the aid of software, known as the user program. This results in great flexibility compared to earlier solutions, in which the logical interconnections were produced by defined wiring between various safety modules. One problem in the programming of a failsafe control system is, however, that the user program to be created is itself a safety-critical element, since an error in the user program can cause an uncontrolled situation and consequently a dangerous state in the case of the monitored machine or installation. Additionally, for monitoring of a large machine installation with many safety devices, the user program can become very complex and confusing, which makes it considerably more difficult to ensure the required failsafety. In this case, serious errors in the user program may be caused not only by human error in the programming but also by programming aids which are not failsafe. If, for example, the user program for the failsafe control system is created by means of a non-failsafe, commercially available personal computer (PC), memory errors of the PC could lead unnoticed to serious falsification of the user program.

In WO 98/44399, a method is disclosed according to which a commercially available PC can be used to program a safety-oriented control system, i.e. a failsafe control system. For this purpose, function-specific program modules in the form of what are known as software macros are stored in the failsafe control system. To create the user program, the user generates program-module function calls with the aid of the PC, which function calls are subsequently transferred to the failsafe control system. With the aid of the program-module function calls, the required program modules in the failsafe control system are called up and linked to form the actual user program. The programming device, i.e. the PC, merely serves for the purpose of selecting and linking the required program modules. The program modules themselves cannot be changed, and consequently the PC cannot exert any influence on them.

The known method simplifies the programming of a failsafe control system. Moreover, a certain safety is additionally achieved by the fact that the program-module function calls transferred to the failsafe control system have to be read back into the programming device and reconfirmed there by the user. However, the known method is not yet optimal with regard to failsafety in the creation of a user program.

SUMMARY OF THE INVENTION

It is therefore an object of the present invention to improve a method and a device of the type mentioned at the beginning such as to achieve still greater failsafety in the programming of the failsafe control system.

It is another object of the invention to provide a method and a device for programming a failsafe control system with a high degree of convenience and failsafety.

According to one aspect of the invention, this object is achieved with a method as mentioned at the beginning, wherein each selected program module is uniquely assigned to a defined functional group, a first functional group containing program modules which pick up input signals of the failsafe control system and, in dependence on them, provide first interim variables, a second functional group containing program modules which logically interconnect the first interim variables to one another and, in dependence on them, provide second interim variables, and a third functional group containing program modules which assign the second interim variables to the output signals of the failsafe control system.

According to another aspect of the invention, this object is achieved with a device as mentioned at the beginning which device comprises a further part, which uniquely assigns a selected program module to a functional group, wherein the functional groups are correspondingly defined as for the method mentioned above.

Preferably, there is a mandatory assignment of a selected program module to one of the defined functional groups which brings about a very clear and structured programming of the failsafe control system. This has the consequence that the likelihood of errors during programming is reduced. In the case of unstructured programming, for example, it is possible for undetected reactions to be formed between various parts of the generated user program. Such reactions may lead to runtime problems or even to "oscillations", which have the consequence of an unstable and dangerous state. These sources of error are reduced considerably, if not avoided completely, by the enforced structuring during programming proposed here. Furthermore, on account of the clear and uniform structure, the plausibility checking of the user program created is also simplified. For example, checking whether a program module from the first functional group is allocated to a logic module from the second functional group just by means of a unique interim variable is now easier and consequently also more reliable.

In addition, a program structured according to the invention can be maintained, i.e. subsequently changed or extended, more easily, as a result of which sources of error during such activities are also reduced. Furthermore, the predetermined structure also leads to greater clarity during the programming itself, as a result of which the risk of human errors, such as for example forgetting individual interconnections that are required, is likewise reduced.

The division into defined functional groups has the overall effect of making the programming more clear and, consequently, even more convenient as well. At the same time, a great advantage of the known method, that is that the programmer relies solely on prefabricated program modules when creating the user program, can be fully retained. The user program is linked here exclusively from checked, failsafe program modules, which likewise reduces sources of error.

In a preferred refinement of the invention, each program module is assigned to precisely one of a total of three defined functional groups.

In this refinement, the structure during programming is divided into exactly three levels. This corresponds to the natural basic structure of the user programs to be created, in which firstly input signals are picked up (first level), subsequently the picked-up signals are processed (second level) and finally the processing results are also output in order to initiate actions (third level). In this refinement, the programming structure is therefore optimally adapted to the circumstances and is therefore especially simple and clear. The risk of errors during programming is therefore still further reduced.

In a further refinement of the invention, each program module of the first functional group evaluates a defined signal source in a failsafe manner.

Defined signal sources in this sense are, for example, emergency-off buttons, protective doors and any other sensors which supply safety-relevant signals. The program modules of the first functional group evaluate these sensors independently and therefore supply as a first interim variable failsafe information on the state of the corresponding sensor. The measure has the advantage that the first interim variable has a "physical" meaning, which can be comprehended very well by the programmer of the user program. Therefore, during programming, the structure becomes especially easy to view, as a result of which sources of error are further reduced.

In a further refinement of the invention, a program-module function call is generated and stored in a sequence table whenever a program module is selected.

This refinement of the invention makes it possible to stationary store prepared and certified program modules in the failsafe control system. The user program created by the programmer with the aid of his programming device can then be restricted to stringing together program-module function calls. Such a user program requires comparatively little storage space and can consequently be transferred to the failsafe control system simply and quickly. It can also be checked more easily. Moreover, as important safety-critical elements, the program modules are withdrawn from access by the programmer. This has the overall effect of further improving both the convenience and the failsafety during programming.

In a further refinement of the previously mentioned measure, the program-module function calls are stored in the sequence table separately according to the functional groups.

This measure has the advantage that the structure according to the invention is reflected not only in the programming itself but also in the user program thereby generated. As a consequence of this, the user program generated has itself fewer sources of error, as a result of which the failsafety is further improved.

In a further refinement of the previously mentioned measure, the program-module function calls are stored in the sequence of the functional groups.

In this refinement, consequently, firstly all the program-module function calls of the first functional group, subsequently those of the second functional group and finally those of the third functional group are stored. The measure has the advantage that the sequence of the program-module function calls implements an optimum time sequence already during the creation of the user program, which further increases the failsafety.

In a further refinement of the invention, the program modules are represented by means of graphic symbols on a graphic user interface.

Due to this measure, it is possible to make the actual programming operation especially easy to view and clear, as a result of which sources of error caused by human failure or carelessness are reduced considerably. The failsafety is again considerably increased.

In a further refinement of the previously mentioned measure, the program modules are selected by means of a drag & drop function.

A drag & drop function is already known per se from graphic user interfaces of commercially available PCs. In this case, an element is marked with an input device, for example with the aid of what is known as a mouse, and then dragged or copied with the aid of the input device to a desired point. Such a type of selection is very simple and convenient for the programmer. As a consequence of this, operator errors and resultant sources of error during programming are further reduced considerably.

In a further refinement of the invention, the functional groups are also represented by means of graphic symbols on a graphic user interface.

The ease of viewing and clarity during programming is also considerably improved by this measure, since the structure according to the invention is visually displayed directly for the programmer. The risk of errors is further reduced on account of the visual control which is thereby directly possible.

In a further refinement of the method according to the invention, the representation of a selected program module on the user interface is generated from a stored, associated program-module function call. The corresponding device according to the invention therefore has a memory for storing a program-module function call in dependence on a selected program module and also a display unit, which generates a representation of the selected program module in dependence on the stored program-module function call.

In this refinement of the invention, a selected program module is visually displayed on the user interface only indirectly. Firstly, the associated program-module function call is stored, to be precise in the format in which it is later fed to the failsafe control system. Only subsequently is the representation of the selected program module generated from the stored program-module function call. The programmer is therefore always provided with a visual display of the program-module function calls actually stored and can consequently recognize directly whether what is stored coincides with what he has specified. Consequently, a check is kept here on the stored program-module function calls directly during selection, as a result of which errors during programming are again reduced considerably. Moreover, there is no longer any need for further control checks on the stored program-module function calls, as an overall result of which the programming is possible very simply and conveniently with a high level of failsafety.

In addition, the measure has the advantage that the programmer can graphically document the created user program very simply. Therefore, later care of the user program is possible very much more simply and with greater failsafety.

It goes without saying that the features mentioned above and still to be explained below can be used not only in the combination respectively indicated but also in other combinations or on their own without departing from the scope of the present invention.

BRIEF DESCRIPTION OF THE DRAWING

Exemplary embodiments of the invention are explained in more detail in the following description and are represented in the appended drawings, in which.

DETAILED DESCRIPTION OF PREFERRED EMBODIMENTS

Figure 1:
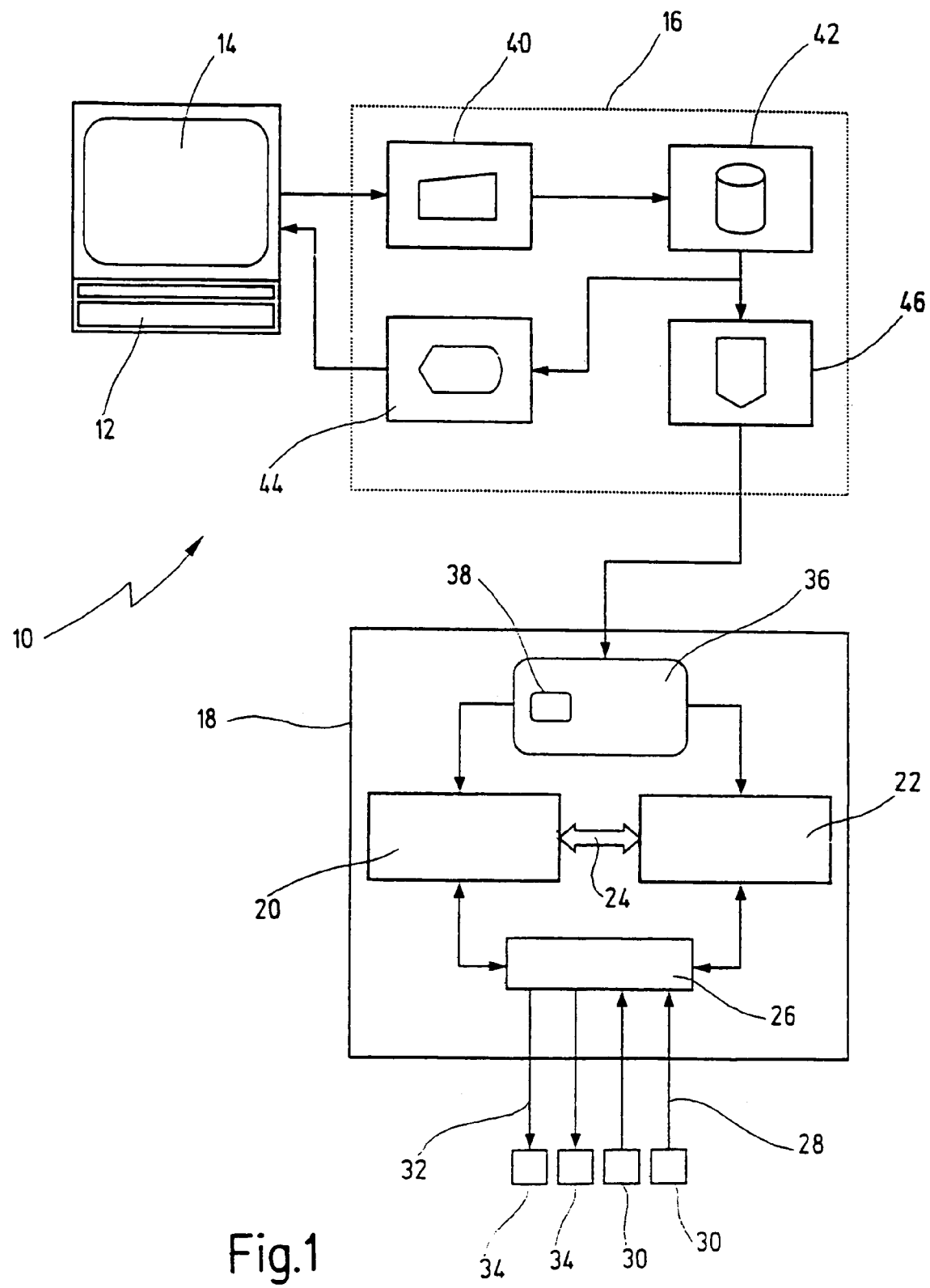
FIG. 1 shows a schematic representation of an embodiment of a device according to the invention in conjunction with a failsafe control system to be programmed.

In FIG. 1, a device according to the invention is designated overall by reference numeral 10.

Device 10 comprises a conventional PC 12 with a monitor 14, on which a computer program 16 is executed. The computer program 16 permits the creation of a user program for a failsafe control system. It is therefore often referred to as a programming tool in technical terminology.

The failsafe control system to be programmed is designated in FIG. 1 by reference numeral 18. It is constructed in a two-channel, redundant manner to achieve the required failsafety for controlling safety-critical processes. Shown in FIG. 1 as representative of the two-channel redundancy are two processors 20, 22, which are separate from each other and which are connected to each other via a bidirectional communication interface 24, to allow them to keep a check on each other and exchange data. The two channels of the failsafe control system 18 and the two processors 20, 22 are preferably constructed with diversity, i.e. differently from each other, in order to substantially exclude systematic errors.

Reference numeral 26 designates an input/output unit, which is in connection with each of the two processors 20, 22. The input/output unit picks up input signals 28 from external sensors 30 and passes them on in an adapted data format to each of the two processors 20, 22. Furthermore, in dependence on the processors 20, 22, the input/output unit generates output signals 32, with which actuators 34 are activated. The sensors 30 are, for example, emergency-off buttons, two-hand controls, protective doors, rotational-speed monitoring devices or other sensors for picking up safety-relevant parameters. The actuators 34 are, for example, what is known as contactors, with which the power supply of a drive or of a complete machine can be switched off.

Reference numeral 36 designates a chip card, on which a user program 38 is stored. The user program 38 is created with the aid of the device 10, and it establishes the control tasks to be carried out by the failsafe control system 18. The use of a chip card 36 as a storage medium in this case permits a simple exchange of the user program 38 even without direct connection to the device 10. As an alternative to this, the user program 38 may also be stored in a memory permanently installed in the failsafe control system 18, for example an EEPROM.

The computer program 16 provides a user interface, explained in more detail below, on a monitor 14 of the PC 12. The user interface makes it possible for a programmer to select and parameterize predefined function-specific program modules, which for their part are permanently stored in the failsafe control system 18. However, the programmer can only select the individual program modules and combine them with one another, he cannot himself change them.

The selection and parameterizing of the predefined program modules is symbolized in FIG. 1 by a function block 40. Once the programmer has selected and, if appropriate, parameterized a desired program module, it is stored in a memory 42 of the PC, to be precise in the format of the failsafe control system 18. "In the format of the failsafe control system" means in this case that a program-module function call which is later fed in this form to the chip card 36 is generated and stored. The stored program-module function call represents a program command in the user program 38.

According to the exemplary embodiment represented here, the computer program 16 generates with the aid of the function block 44 from the stored program-module function call a symbolic representation of the corresponding, associated program module on the user interface of the PC 12. For the programmer this means that he selects a program module in the manner explained in more detail below, and it follows solely from the fact that the desired selection is visually displayed to him that the correct associated program-module function call was stored in the memory 42.

When the programmer has selected and, if appropriate, parameterized all the program modules required for his user program, the complete user program is in the memory 42. It is preferably additionally protected there by a CRC (Cyclic Redundancy Check). The user program can then be transferred from the memory 42 with the function block 46 in a way known per se to the chip card 36. By protecting it with the CRC, it is thereby ensured that the user program stored on the chip card 36 coincides exactly with the user program previously generated and stored in the memory 42.

During the transfer, the chip card 36 may be inserted in the failsafe control system 18, which requires a corresponding communication connection between the PC 12 and the failsafe control system 18. As an alternative, the user program 38 may also be written to the chip card 36 by means of a loading unit known per se (not represented here). The failsafe control system 18 is then supplied with the user program 38 by simple insertion of the written chip card 36.

According to a further preferred embodiment of the invention, the two processors 20, 22 run the user program 38 diversely. This can take place for example with the aid of functionally identical, but different program modules, which are activated by a uniform program-module function call. A comparison of the respective results between the two processors 20, 22 then permits failsafe checking of the user program 38. In this way it is possible to make the user program 38 more failsafe, without individually checking all the conceivable combinations of the program modules that are available.

Figure 2:
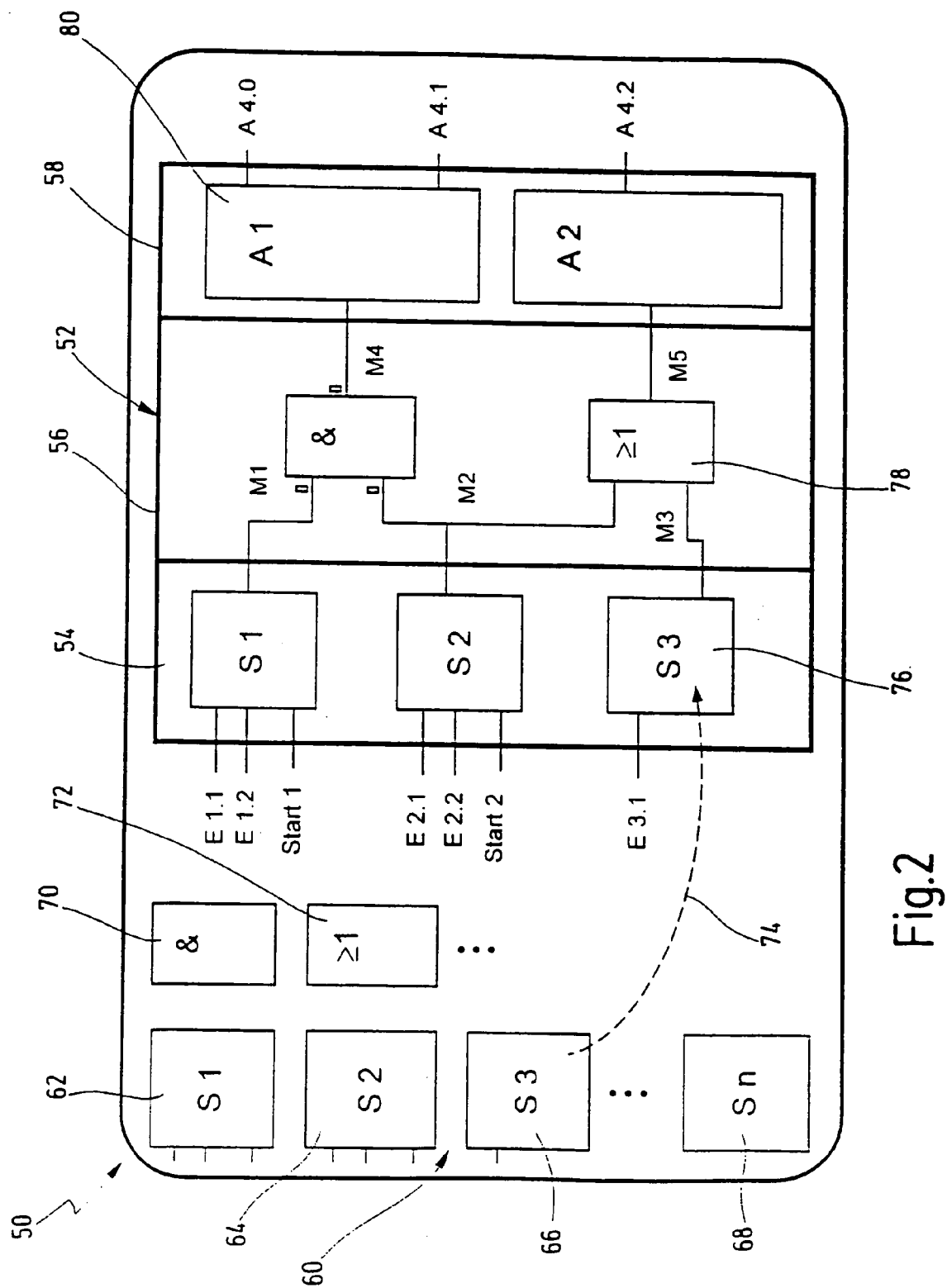
FIG. 2 shows a simplified representation of a graphic user interface of the device of FIG. 1 for programming the failsafe control system.

In FIG. 2, a graphic user interface which presents the computer program 16 to the programmer on the monitor 14 is designated overall by the reference numeral 50.

The user interface 50 comprises a programming area 52, which, according to the preferred exemplary embodiment of the invention represented here, is graphically divided into three separate functional groups 54, 56, 58. Outside the programming area 52, a set 60 of selectable program modules 62, 64, 66, 68, 70, 72 is represented in the form of graphic symbols. The selection of one of these program modules takes place by moving the corresponding symbol with the aid of a drag & drop function into the functional group provided for it of the programming area 52, as represented by way of example by an arrow 74. Program modules selected in this way are designated by way of example by the reference numerals 76, 78, 80.

The program modules 62–72 available for selection can be roughly divided into three different types, which correspond to the three defined functional groups 54, 56, 58. The functional group 54 receives program modules 62–68, which independently evaluate a defined signal source, i.e. a defined sensor 30, in a failsafe manner. The program modules 62–68 are accordingly referred to as sensor modules here. Each sensor module 62–68 is adapted to a specific type of sensor, such as for example to an emergency-off button, a protective door or two-hand control. The sensor module 62 is, for example, a program module for the failsafe evaluation of a signal source with two redundant normally open contacts and with a monitored start. Sensor module 64 serves for example for the failsafe evaluation of a signal source with a normally open contact and a normally closed contact and also with a non-monitored start. Sensor module 66 serves for example for the evaluation of a signal source with only a normally closed contact. Further sensor modules 68 serve for the evaluation of signal sources with semiconductor outputs, such as for example light barriers. Altogether, the set 60 comprises sensor modules for all sensors 30 coming into consideration.

The sensor modules 62–68, which can be assigned to the first functional group 54, receive as input parameters the input signals 28 of the sensors 30. As transfer parameters, they provide first interim variables, which are referred to as markers in technical terminology. In the representation given by way of example in FIG. 2, the markers M1, M2 and M3 are represented as first interim variables at the outputs of a total of three selected sensor modules.

The functional group 56 serves exclusively for receiving program modules which logically connect the first interim variables to one another and, in dependence on this, provide second interim variables. In the representation in FIG. 2, the two markers M1 and M2 are connected for example by a logical AND. The markers M2 and M3 are connected by a logical OR. At the outputs of the corresponding program modules, the second interim variables M4 and M5 are then available.

In addition to the logic modules shown here, the second functional group 56 also serves for receiving other program modules, which further process the first interim variables to form second interim variables, such as for example negations or time delays.

The third functional group 58 serves for receiving what are known as actuator modules, i.e. those program modules which generate output signals for the activation of the actuators 34 from the second interim variables. In FIG. 2, the actuator module 80 serves for example for the activation of two redundant contactors, with which the power supply of a monitored drive can be switched off in a two-channel and consequently failsafe manner.

The creation of the user program 38 for the failsafe control system 18 takes place by selecting and linking the desired program modules 62–72. With the selection of a desired program module, the computer program 16 generates a correspondingly associated program-module function call, which is stored in the memory 42 in a so-called sequence table. For the programming operation represented by way of example in FIG. 2, the following sequence table is thereby obtained:

| Line | Module type | Output 1 | Output 2 | Input 1 | Input 2 | Input 3 |
|---|---|---|---|---|---|---|
| 1 | Sensor type 1 | M1 | — | E 1.1 | E 1.2 | Start 1 |
| 2 | Sensor type 2 | M2 | — | E 2.1 | E 2.2 | Start 2 |
| 3 | Sensor type 3 | M3 | — | E 3.1 | — | — |
| 4 | AND | M4 | — | M1 | M2 | — |
| 5 | OR | M5 | — | M2 | M3 | — |
| 6 | Actuator type 1 | A 4.0 | A 4.1 | M4 | — | — |
| 7 | Actuator type 2 | A 4.2 | — | M5 | — | — |

In the "Module type" column, the respective program-module function call appears in a coding which can be read by the failsafe control system 18. In the columns which follow, the transfer parameters are given which the correspondingly called program module receives and returns.

According to a particularly preferred exemplary embodiment of the invention, the computer program 16 arranges the individual program-module function calls in the sequence table in chronological sequence, i.e. in the sequence of the three functional groups 54, 56, 58. Consequently, the structure which is already obtained during programming on account of the graphic user interface 50 is continued in the user program 38 that is ultimately generated and used. Consequently, a clearly divided and structured user program 38 is produced.

In preferred exemplary embodiments of the invention, the user program 38 is always protected by a CRC when it is transferred from the memory 42 onto the chip card 36. In this way, falsification of the user program during the transfer to the chip card 36 can be reliably detected and if need be prevented.

What is claimed is:

1. A method of programming a failsafe control system having an input stage for receiving input signals, an output stage for providing output signals, and a processing stage for executing a failsafe control program, said method comprising the steps of:
   providing a set of predefined function-specific program modules comprising first program modules configured to pick up the input signals in a failsafe manner and to provide first interim variables in response thereto, second program modules configured to generate second interim variables corresponding to logical interconnections between said first interim variables, and third program modules configured to assign said second interim variables to said output signals,
   providing a graphic user interface having a display screen with a programming area that is divided into at least first, second and third sub-areas;
   assigning a graphic symbol to each of said program modules;
   selecting a plurality of the first, second, and third program modules from the set of program modules, and
   combining the program modules selected to form the failsafe control program by selectively placing the graphic symbol assigned to each of said selected plurality of first, second and third program modules into one of said first, second and third sub-areas in said programming area on said display screen;
   wherein the graphic symbol assigned to a first program module can only be placed in the first sub-area, the graphic symbol assigned to a second program module can only be placed in the second sub-area, and the graphic symbol assigned to a third program module can only be placed in the third sub-area; and further,
   wherein the placement of said graphic symbols within each of said sub-areas in said programming area on said display screen determines the interconnection of the selected program modules in the failsafe control program.

2. The method of claim 1, further including the step of rejecting an attempted placement of the graphic symbol for a first program module in either the second or third sub-areas in the programming area of the display screen.

3. The method of claim 1, further including the step of rejecting an attempted placement of the graphic symbol for a second program module in either the first or third sub-areas in the programming area of the display screen.

4. The method of claim 1, further including the step of rejecting an attempted placement of the graphic symbol for a third program module in either the first or second sub-areas in the programming area of the display screen.

5. The method of claim 1, wherein the first interim variable associated with a selected first program module is interconnected with a selected second program module, and the second interim variable associated with said selected second program module is interconnected with a selected third program module.

6. The method of claim 1, wherein a program-module function call is generated and stored in a sequence table, whenever a program module from the set of program modules is selected, and wherein said sequence table is transferred to the failsafe control system.

7. The method of claim 1, wherein the program modules are selected by means of a drag & drop function on the graphic user interface.

8. A device for programming a failsafe control system having an input stage for receiving input signals, an output stage for providing output signals, and a processing stage for executing program modules selectable from a set of predefined function-specific program modules stored in a memory, said function-specific program modules comprising first program modules configured to pick up said input signals in said control system and to provide first interim variables in response thereto, second program modules defining logical interconnections between said input signals and to provide second interim variables in response thereto, and third program modules configured to assign said second interim variables to said output signals; said programming device comprising:
   a computer connected to said memory and including an operator interface with a display screen having a programming area that is divided into at least first, second, and third sub-areas, said computer being programmed to enable an operator via said interface to select from said memory a plurality of the first, second, and third program modules from said set of program modules and interconnect said selected plurality of program modules to form a failsafe control program by selectively placing symbolic representations of said selected plurality of program modules into said first, second and third sub-areas, said computer being further programmed to prohibit the placement of (i) a first program module in either of the second or third sub-areas, (ii) a second program module in either of the first or third sub-areas, and (iii) a third program module in either of the first or second sub-areas; and
   means for transferring said formed failsafe control program to the failsafe control system.

9. The programming device of claim 8, wherein said computer is further programmed to automatically interconnect a selected first program module placed in said first sub-area with a selected second program module placed in said second sub-area.

10. The programming device of claim 8, wherein said computer is further programmed to automatically interconnect a selected second program module placed in said second sub-area with a selected third program module placed in said third sub-area.

11. The programming device of claim 8, wherein each of said set of program modules is identified as either a first program module, a second program module, or a third program module when stored in said memory.

12. The programming device of claim 8, wherein said display screen further includes an area outside said programming area where graphical symbols representing each of said plurality of selectable program modules stored in said memory are located.

13. The programming device of claim 12, further wherein the computer is programmed to enable the operator to select individual program modules by moving the corresponding graphical symbol for said selected program module into the appropriate first, second, or third sub-area in the programming area on said display screen.

* * * * *